Patented May 11, 1943

2,318,813

UNITED STATES PATENT OFFICE 2,318,813

METHOD OF PRESERVING LATEX AND PRODUCT THEREOF

William D. Stewart, Akron, Ohio, assignor to The B. F. Goodrich Company, New York, N. Y., a corporation of New York No Drawing. Application December 21, 1940, Serial No. 371,205

11 Claims. (Cl. 260—820)

This invention relates to a method of preserving latex, particularly fresh latex, and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory.

I have discovered a method of preserving latex, particularly freshly-collected latex, that produces a sterile, stable latex that will stand for long periods without putrefaction or coagulation. By the method of this invention the pH of the latex is adjusted to a point not less than 9.8 nor more than 10.0 by means of buffer solutions, alkalies, or the like. The preferred manner is by adding ammonia to the latex in from 0.25% to 0.35% by weight of the latex. To this latex is then added small quantities of the material commonly known as aldehyde-ammonia, which is the addition compound of acetaldehyde and ammonia existing in the main as molecules with complex structures. The aldehyde-ammonia may be used in the latex in any desired quantities but is preferably used in amount between 0.01% and 0.20% by weight of the latex. It may be added either before or after the pH of the latex has been adjusted to the specified range of not less than 9.8 nor more than 10.0 and, if necessary, the pH may be readjusted to bring it within this specified range after the addition of the aldehyde-ammonia. The latex should be treated by the method of this invention without any undue interval of time after it has been collected from the trees, preferably within eighteeen hours after such collecting.

In a specific example of this invention ammonia is added to freshly-collected latex until the pH is raised to 9.8, and immediately thereafter 0.10 of aldehyde-ammonia by weight of the latex is added to the latex. This produces a latex that will remain well-preserved through long periods of shipment and storage and although the method is more useful for preserving freshly-collected latex it is also applicable to and produces excellent results with latex that has been previously preserved by other methods.

As will be apparent from the foregoing the preserved latex prepared according to this invention ordinarily will contain only the natural latex itself and the ammonia or other material added in adjusting the pH together with the aldehyde-ammonia as described. Any of the usual compounding or conditioning agents may later be added as desired to prepare the latex for specific uses but such materials preferably are not added at the plantation.

Having disclosed my invention it is my desire to protect it broadly within the spirit and scope of the appended claims.

I claim:

1. The method of preserving latex which comprises adjusting the pH of the latex to not less than 9.8 nor more than 10.0 and adding a small proportion of acetaldehyde-ammonia.

2. The method of preserving freshly-collected latex which comprises adjusting the pH of the latex to not less than 9.8 nor more than 10.0 and adding a small proportion of acetaldehyde-ammonia.

3. The method of preserving freshly-collected latex which comprises treating the latex with sufficient alkali to raise the pH to not less than 9.8 nor more than 10.0 and adding a small proportion of acetaldehyde-ammonia.

4. The method of preserving freshly-collected latex which comprises treating the latex with sufficient ammonia to raise the pH to not less than 9.8 nor more than 10.0 and adding a small proportion of acetaldehyde-ammonia.

5. The method of preserving freshly-collected latex which comprises adjusting the pH of the latex to not less than 9.8 nor more than 10.0 and adding not less than 0.01% nor more than 0.20% by weight of acetaldehyde-ammonia.

6. The method of preserving freshly-collected latex which comprises treating the latex with sufficient alkali to raise the pH to not less than 9.8 nor more than 10.0 and adding not less than 0.01% nor more than 0.20% by weight of acetaldehyde-ammonia.

7. The method of preserving freshly-collected latex which comprises treating the latex with sufficient ammonia to raise the pH to not less than 9.8 nor more than 10.0 and adding not less than 0.01% nor more than 0.20% by weight of acetaldehyde-ammonia.

8. Preserved latex having a pH not less than 9.8 nor more than 10.0 and containing a small proportion of acetaldehyde-ammonia.

9. Preserved latex having a pH not less than 9.8 nor more than 10.0 and containing an alkali and a small proportion of acetaldehyde-ammonia.

10. Preserved latex having a pH not less than 9.8 nor more than 10.0 and containing ammonia and a small proportion of acetaldehyde-ammonia.

11. Preserved latex having a pH not less than 9.8 nor more than 10.0 and containing ammonia and not less than 0.01% nor more than 0.20% by weight of acetaldehyde-ammonia.

WILLIAM D. STEWART.